United States Patent [19]

Hill, Sr. et al.

[11] 4,391,784
[45] Jul. 5, 1983

[54] FOAM CONTROL DURING PRODUCTION OF PHOSPHORIC ACID

[76] Inventors: Richard N. Hill, Sr., 3412 Polk Ave.; Charles D. B. Hill, 1475 Woodlake Dr., Apt. 182, both of Lakeland, Fla. 33803

[21] Appl. No.: 293,850

[22] Filed: Aug. 18, 1981

[51] Int. Cl.³ .............................................. C01B 25/16
[52] U.S. Cl. .................................. 423/320; 423/166; 423/167; 423/319; 252/321
[58] Field of Search .................. 423/319, 320, 321 R, 423/317, 166, 167; 252/321

[56] References Cited

U.S. PATENT DOCUMENTS

| | | | |
|---|---|---|---|
| 1,125,897 | 1/1915 | Callow | 252/321 |
| 3,148,948 | 9/1964 | Lutz | 423/320 |
| 3,653,827 | 4/1972 | Hey et al. | 252/321 |

Primary Examiner—Gregory A. Heller

[57] ABSTRACT

Foam generated during the digestion of phosphate rock is removed from the slurry either by overflow, mechanical sweeps, or by vacuum from strategically located nozzles connected to vacuum lines. The foam, after liquefaction, is returned to the filter where it results in improved filtration and return of soluble $P_2O_5$.

5 Claims, No Drawings

FOAM CONTROL DURING PRODUCTION OF PHOSPHORIC ACID

BACKGROUND OF THE INVENTION

In the commercial production of phosphoric acid, ground phosphate rock is metered to a digestion circuit along with weak (about 18-20% P2O5) phosphoric acid recycled from the filter plus recycled slurry and fresh sulphuric acid. This mixture is stirred and recycled until substantially all the rock has been digested.

Excess slurry is overflowed to a filter feed tank, thence to a filter where gypsum is separated from the strong (about 28-30% P2O5) phosphoric acid. Wash water, in countercurrent washing steps, displaces the residual acid from the cake which then becomes the source of the weak recycle phosphoric acid. Reference is made to Chapter 16 of Volume II, "Phosphorus And Its Compounds", edited by John R. Wazer, published by Interscience Publishers, 1961.

Phosphate rock usually contains about 1 to 10% CO2, generally 4 to 6% plus 0.1 to 4.0% organic material, generally 0.2 to 0.8%. As the rock is attacked by the phosphoric acid-sulphuric acid mixture, considerable foam is generated and, if allowed to remain, becomes stable and will overflow the digestion tanks. To control this condition several techniques have been applied such as mechanical foam breakers, steam jets, water jets, and air jets played on the surface of the foam. It is said that this causes the bubbles to break and the liquified foam then is returned into the body of the slurry. The most accepted method, however, has been to add surfactants or commercial defoamers which cause the bubbles to collapse and the liquified foam is returned into the body of the slurry.

SUMMARY OF THE INVENTION

It has now been discovered that if the foam is removed as it is generated, the gypsum crystals formed are better suited for filtration. Considerable increase in filtration rates and washing efficiency has been realized after the foam has been removed from the digestion circuit. Removal of the foam by mechanical means, while beneficial, has produced a material difficult to handle. A more satisfactory technique has been to remove the foam via strategically located nozzles attached to lines connected to a vacuum source. The foam bubbles break under the vacuum and liquify in the line which is connected to a receiver where the air and liquified foam are easily separated. This liquid, about 1 to 15% by volume of the slurry, contains a substantial portion of the organic and other impurities that ordinarily would have been incorporated in the main body of the slurry where the gypsum crystals are being formed. By removal of the foam, gypsum crystal formation has been considerably improved. The liquified foam also contains considerable soluble P2O5 which can be returned to the slurry just prior to filtration either in the filter feed tank or in the feed to the filter or on the filter cake just prior to the washing step. No detrimental effect in either filtration rates or washing efficiency has been measured by addition of the liquified foam after the gypsum crystals have been formed in the early digestion.

To enhance the removal of more foam, the use of air spargers has increased the quantity of foam removed.

After the foam has been removed, use of a commercial defoamer has helped in liquification of the foam.

To aid in retaining the organic material in or on the cake a commercial flocculating agent can be used.

The invention includes removal of foam during the production of commercial phosphoric acid comprising continuously removing the foam from the surface of the slurry formed in the early stage of the digestion and continuously returning the foam to the slurry prior to filtration or to the filter cake prior to the wash steps. In one embodiment the foam is continuously removed by strategically located nozzles under slight vacuum to a central receiver and thence to the slurry prior to filtration. In another the foam is continuously removed and returned to the filter cake prior to the washing step. In still another air is continuously injected below the surface of the slurry in sufficiently fine bubbles to help the foam leave the slurry and float on the surface. In another aspect a flocculating agent is added to the foam prior to being returned to the system.

EXAMPLE

About 6000 cc of slurry was obtained and divided into three equal parts. To each was added about 96 gms of dried ground rock, 160 cc of recycle acid, and 46 cc of 94.12% H2SO4. In the first run, the foam was controlled by addition of a plant defoamer. On the next two runs, the foam was removed via a vacuum line into a vacuum filtrate flask. Each sample was digested for four hours at 185° F. The first run was filtered directly and the rate measured. The second run had the liquified foam returned to the slurry approximately ten minutes before filtering. In the third run, the liquified foam was added over the cake just prior to washing. In each case, the rates were measured and samples of the cake analyzed for P2O5 and moisture.

Table I is a summary of the results.

TABLE I

|  | Filtration Rate; calculated to T P2O5/sq.ft./day | Cake; % tot. P2O5 | Cake; % moisture |
| --- | --- | --- | --- |
| Run #1 | 0.8 | 1.4 | 32 |
| Run #2 | 1.3 | 0.8 | 28 |
| Run #3 | 1.4 | 0.6 | 28 |

It is clear that foam removal increases the filtration rate, reduces the P2O5 loss, and decreases the cake moisture.

What is claimed is:
1. In the production of phosphoric acid comprising the steps:
   (a) digesting ground phosphate rock with sulfuric acid and weak phosphoric acid recycled from Step (d) below to form a slurry comprising strong phosphoric acid and byproduct gypsum, and forming a foam on the surface of the slurry;
   (b) passing the slurry to a filtration operation;
   (c) separating gypsum from strong phosphoric acid in the said filtration operation thereby forming a gypsum filter cake of gypsum crystals;
   (d) washing the gypsum filter cake with wash water thereby forming weak phosphoric acid, and recycling said weak phosphoric acid to the digestion in Step (a); the improvement comprising
   (e) removing foam from the slurry surface;
   (f) liquifying the removed foam; and

(g) passing the resultant liquid to the filtration operation; whereby the said gypsum crystals are caused to be better suited for filtration, and soluble $P_2O_5$ is returned in the liquified foam.

2. A method as defined in claim 1 wherein the foam is continuously removed by strategically located nozzles under slight vacuum to a central receiver and thence to the slurry prior to filtration.

3. A method as defined in claim 1 wherein the foam is continuously removed and returned to the filter cake prior to the washing step.

4. A method as defined in claim 1 wherein air is continuously injected below the surface of the slurry in sufficiently fine bubbles to help the foam to leave the slurry and float on the surface.

5. A method as defined in claim 1 wherein a flocculating agent is added to the foam prior to being returned to the process.

* * * * *